3,429,666
PREVENTION OF PRECIPITATE FORMATION IN STANNATE STABILIZED HYDROGEN PEROXIDE
George V. Morris, Riverside, and Paul B. Weill, Newport, R.I., assignors to the United States of America as represented by the Secretary of the Navy
No Drawing. Filed May 7, 1965, Ser. No. 454,224
U.S. Cl. 23—207.5                    10 Claims
Int. Cl. C01b 15/02

ABSTRACT OF THE DISCLOSURE

A method of preventing precipitate formation in a stabilized peroxide composition by the addition of a soluble fluoride and the resulting peroxide composition containing stabilizer and fluoride.

---

The invention described herein may be manufactured and used by or for the Government of the United States of America for governmental purposes without the payment of any royalties thereon or therefor.

This invention relates to the prevention of separation of aluminum-containing solids from concentrated aqueous solutions of hydrogen peroxide, particularly those solutions containing tin compounds. More particularly, this invention relates to the use of the fluoride ion as an additive in such solutions in a concentration sufficient to form preferentially a soluble aluminum fluoride complex, thus preventing the separation of insoluble aluminum-containing products which commonly occurs when aluminum metal or aluminum alloys are in contact with stannate-stabilized hydrogen peroxide solutions.

Concentrated hydrogen peroxide has many military and space applications. Its high energy of decomposition and the release of large volumes of gases make it especially useful as a chemical propellant in such devices as rockets or torpedoes and as a steering propellant for space vehicles and the like. In such applications the solution is commonly stored in aluminum containers.

It is well known that hydrogen peroxide has a corrosive effect on aluminum and aluminum alloys. In the absence of the conventional stabilizers, aluminum ions are introduced into the hydrogen peroxide solution by corrosion of the aluminum of the container with which it comes into contact. The common stabilizer, a sodium stannate sol, is effective to reduce the rate of decomposition of hydrogen peroxide but suffers a serious disadvantage in that it is coagulated quite easily by aluminum ions. Whereas hydrogen peroxide solutions devoid of tin additive can tolerate about 50 parts per million of aluminum, the presence of even minute tin concentrations lowers the tolerance for aluminum to 0.2 p.p.m. The addition of a phosphate stabilizer improves the situation slightly by raising the tolerance level to approximately 1.0 p.p.m. Above the tolerance level, however, the coagulant precipitates out as hard, abrasive particles. Thus, not only do the aluminum ions lower the capability of the stannate to stabilize the hydrogen peroxide solution, but also the presence of the abrasive particles is deleterious to the pipes, pumps, valves and other equipment used to handle the hydrogen peroxide solution.

It is an object of this invention to provide a novel combination of stabilizing agents for concentrated hydrogen peroxide.

It is another object of the invention to prevent the separation of abrasive particles from solutions of stabilized hydrogen peroxide.

The objects of the invention are accomplished by adding to a stannate-phosphate stabilized hydrogen peroxide solution a sufficient quantity of a soluble fluoride salt. The stannate exerts its stabilizing effect in concentrated hydrogen peroxide by acting as a sink for the various trace heavy metal impurities which may be present and which act as catalysts for the decomposition of hydrogen peroxide. The stannate apparently forms a negatively charged sol which attracts and holds the heavy metal ions, perhaps by coulombic attraction. When the metal ions are present in such a concentration as to effectively bring about change neutralization, the sol particles coalesce and precipitate. As noted above, this precipitation has been found to occur even in the presence of a phosphate additive.

The present inventors have discovered that the fluoride ion, added to the solution in the form of a soluble salt in a concentration of at least six times in excess of the maximum expected aluminum ion concentration, is capable of preventing sol precipitation. Any soluble fluorine containing compound which leads to the formation of an aluminum fluoride complex can be used in the practice of this invention. For practical purposes, the alkali metal salts are preferred because of their low cost and ready availability, but the alkaline earth metal fluorides such as calcium fluoride, magnesium fluoride, and the like, as well as ammonium fluoride and hydrofluoric acid can be used with equal advantage. The fluorine ion combines preferentially with the aluminum to form the complex $AlF^{-3}$ which is stable and soluble. Thus, the aluminum is effectively prevented from reacting with the stannate stabilizer.

The invention is operative over the whole $H_2O_2$ concentration range and is especially valuable within the range of 25 to 95 percent hydrogen peroxide.

The apparent pH (as measured directly by a pH meter using glass and calomel electrodes) of a hydrogen peroxide solution at its equivalence point varies with the concentration of hydrogen peroxide from a value of pH=4.5 for 25% hydrogen peroxide to pH=0 for 95% hydrogen peroxide. The maximum stability of a hydrogen peroxide aqueous solution is known to be found at its equivalence point or within a narrow deviation therefrom. The pH of the hydrogen peroxide solution, to which protective fluoride ions will be added, is therefore adjusted by the careful use of acid or base to any value falling within a range ±1.0 pH units from the equivalence point.

The following example is given to illustrate the invention and is not intended to be limiting in any way:

Example

A stock solution of stabilized 90% hydrogen peroxide was prepared to have the following composition of additives: $Na_2SnO_3 \cdot 3H_2O$ at a concentration of $$2.79 \times 10^{-4} \text{ M and } Na_2HPO_4 \cdot 7H_2O$$

at $2.8 \times 10^{-4}$ M. The pH of the solution was adjusted with nitric acid to the value of +0.1. All the chemicals used were reagent grade with the exception of the hydrogen peroxide solution, which was commercial grade 98% unstablized hydrogen peroxide. The stock solution was prepared three weeks prior to its use.

Fluoride ion was introduced into three 10 cc. samples of the hydrogen peroxide stock solution by using an aqueous ammonium fluoride solution of an appropriate concentration such that its addition did not appreciably change the concentration of the hydrogen peroxide. The fluoride ion concentration in the three hydrogen peroxide solutions was: $7.07 \times 10^{-7}$ M, $1.41 \times 10^{-6}$ M and $8.9 \times 10^{-6}$ M. Aluminum ion was introduced into these three solutions with efficient stirring using an aqueous aluminum nitrate solution of an appropriate concentration such that its addition did not appreciably change the concentration of the hydrogen peroxide. The aluminum ion concentration in the three solutions was 2, 4, and 25 p.p.m. Two 10 cc. samples of stock hydrogen peroxide solution containing only aluminum ion were also prepared for comparison. The aluminum ion was introduced by the method outlined above, and its concentration in these two solutions was 2 and 4 p.p.m.

The five solutions were stored at 25° C. The duration of the tests was thirty days, but when precipitate formation occurred, it did so generally within twenty four hours.

The following table illustrates the results:

| $Al^{+3}$ concentration (p.p.m.) | $F^-$ concentration (M) | pH | Result |
|---|---|---|---|
| 2 | $7.07 \times 10^{-7}$ | +0.2 | − |
| 4 | $1.41 \times 10^{-6}$ | +0.1 | − |
| 25 | $8.9 \times 10^{-6}$ | +0.4 | − |
| 2 | | +0.2 | + |
| 4 | | +0.2 | + |

(−) Negative result—no precipitate formation occurred in 30 days.
(+) Positive result—precipitate formation occurred within twenty-four hours.

It is apparent that when fluoride ion is present in at least six fold excess of the aluminum ion concentration, precipitate formation is prevented.

The chief advantage to be gained by the use of the fluoride ion is that it forms a stable, soluble complex with aluminum ion in aqueous hydrogen peroxide solution and particularly in highly concentrated hydrogen peroxide. There is an added advantage in that the fluoride is completely compatible with the hydrogen peroxide.

It is to be understood that within the scope of the appended claims the invention may be practiced otherwise than as herein specifically described.

What is claimed is:
1. A composition consisting of
    a stannate stabilized aqueous hydrogen peroxide solution, and
    a soluble fluorine containing compound selected from the group consisting of the alkali metal fluorides, the alkaline earth metal fluorides, ammonium fluoride, and hydrofluoric acid.
2. A composition consisting of
    a stannate stabilized aqueous solution of hydrogen peroxide and aluminum in the stable, soluble complex $AlF_6^{-3}$.
3. A composition as recited in claim 1 further consisting of a phosphate stabilizer for said hydrogen peroxide.
4. A composition according to claim 3 further consisting of
    nitric acid in sufficient amount to adjust the pH of the solution to within ±1.0 of its equivalence point.
5. A composition as recited in claim 4 wherein the soluble fluorine containing compound is ammonium fluoride.
6. A method of preventing the separation of aluminum-containing solids from a stannate stabilized hydrogen peroxide solution in contact with aluminum metal comprising,
    complexing aluminum in said solution with fluorine.
7. A method of preventing the separation of aluminum-containing solids from a stannate-stabilized concentrated aqueous hydrogen peroxide solution in contact with aluminum metal comprising,
    complexing aluminum ions in said solution with fluoride ions to form the stable soluble complex $AlF_6^{-3}$.
8. A method as recited in claim 7 wherein said fluoride ions are introduced into said solution by adding thereto a soluble fluorine containing compound selected from the group consisting of the alkali metal fluorides, the alkaline earth metal fluorides, ammonium fluoride and hydrofluoric acid.
9. A method as recited in claim 8 wherein the soluble fluorine containing compound is added in sufficient quantity to provide a fluoride ion concentration at least six times in excess of the maximum aluminum ion concentration in said solution.
10. A method of stabilizing a concentrated aqueous solution of hydrogen peroxide while preventing the separation of aluminum-containing solids from said solution when it is stored in contact with aluminum metal, comprising the steps of
    adding sodium stannate and sodium phosphate to said solution in stabilizing amounts,
    adjusting the pH of said solution to within ±1.0 of its equivalence point by adding nitric acid thereto, and
    complexing aluminum in said solution with fluoride ions obtained by dissolving in said solution a fluorine containing compound selected from the group consisting of the alkali metal fluorides, the alkaline earth metal fluorides, ammonium fluoride and hydrofluoric acid.

References Cited

UNITED STATES PATENTS 2,086,123   7/1937   Eisenman _____ 23—207.5

FOREIGN PATENTS 671,980   10/1963   Canada.

OTHER REFERENCES

Mellor: Comprehensive Treatise on Inorganic and Theoretical Chemistry, vol. 2, (1922), p. 139.

OSCAR R. VERTIZ, *Primary Examiner.*

HOKE S. MILLER, *Assistant Examiner.*